United States Patent [19]

Mayer

[11] Patent Number: 4,615,580

[45] Date of Patent: Oct. 7, 1986

[54] FIBER OPTIC HIGH SPEED PULSE SCANNER

[75] Inventor: Edward F. Mayer, San Jose, Calif.

[73] Assignees: Ricoh Company, Ltd., Tokyo, Japan; Ricoh Systems, Inc., San Jose, Calif.

[21] Appl. No.: 586,027

[22] Filed: Mar. 5, 1984

[51] Int. Cl.$^4$ ............................ G02B 6/36; G02B 7/26
[52] U.S. Cl. ..................................... 350/96.20; 446/15
[58] Field of Search ............... 350/96.15, 96.20, 96.21, 350/96.34; 446/15-21

[56] References Cited

U.S. PATENT DOCUMENTS 4,121,884 10/1978 Greenwood ............... 350/96.15
4,505,539 3/1985 Auracher et al. ........... 350/96.15

Primary Examiner—William L. Sikes
Assistant Examiner—Robert E. Wise
Attorney, Agent, or Firm—Flehr, Hohbach, Test, Albritton & Herbert

[57] ABSTRACT

A thermally responsive shutter interrupts or transmits light through an optical fiber. A small heater, such as a resistance heater, is positioned centrally under a gap in an optical fiber. At one end of the fiber is an illumination source; the opposite end of the fiber is the output end. The gap between the two segments of the optical fiber is filled by an opaque dye solution comprising a volatile organic or other liquid, and a high opacity dye. In the normal state, the dye solution interrupts the light passing through the glass fiber. Upon activation of the heater, the gap is sufficiently small that a bubble will form between the ends of the glass fibers. This removes substantially all of the dye from the gap between the fibers, and permits light to pass from the light source to the output end of the optical fiber.

14 Claims, 2 Drawing Figures

U.S. Patent  Oct. 7, 1986  4,615,580
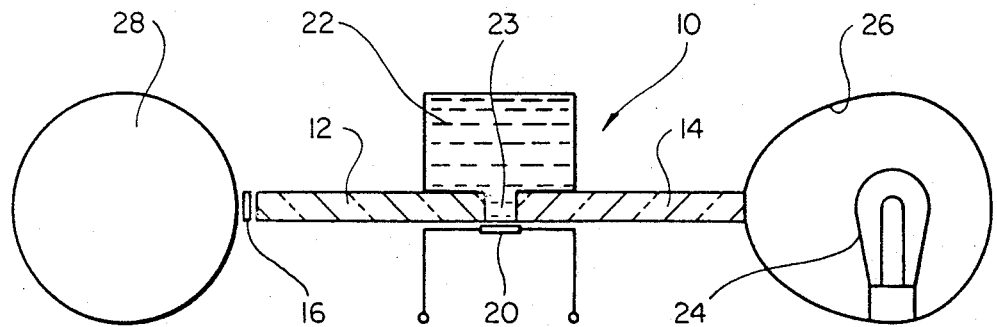
FIG_1
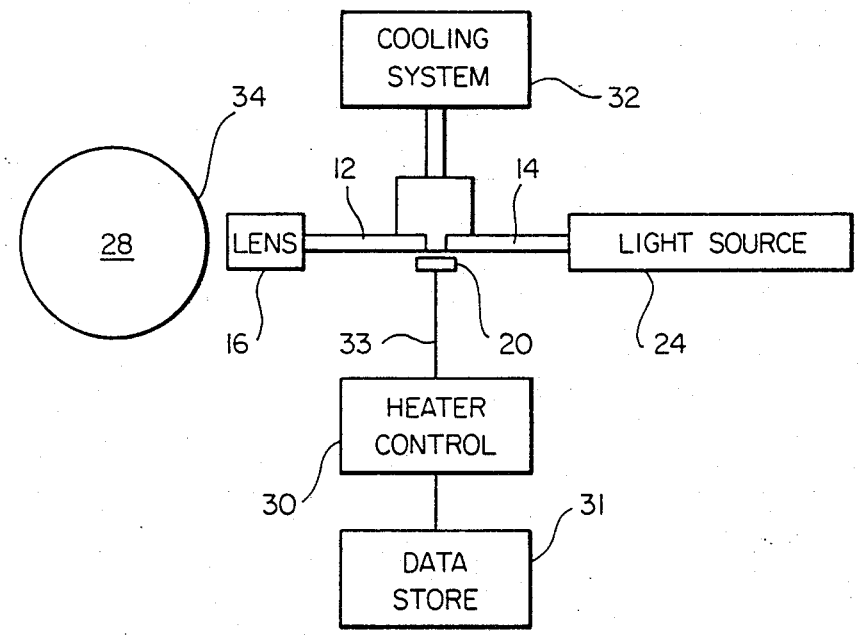
FIG_2

FIBER OPTIC HIGH SPEED PULSE SCANNER

The present invention relates generally to an optical switch and more specifically to a fiber optical switch which is actuated by a heater to actuate a shutter which is blocking the passage of light through the optical fiber.

The present invention is especially suitable for use in electrophotographic copying apparatus in which electrically charged toner of one polarity is transferred from an oppositely charged electrostatic image on an outer surface of a photoconductive drum to the front side of a blank sheet for transforming the later into an intended copy.

Such apparatus includes a rotatable drum having a photoconductive circumferential surface, and means for rotating the drum in a controlled fashion so that its outer circumferential surface defines a fixed annualar path of movement. As typically used, the apparatus produces copies from a given master by forming an electrostatic image corresponding to the particular information to be copied on the photosensitive outer circumferential surface of the drum. Thereafter the latent image is developed by means of toner particles, specifically electrically charged heat fusible particles, which are applied to the image bearing surface in a specific way. Finally the applied toner particles are transferred from the drum to the blank sheet and thereafter fused thereon for transforming the sheet into a permanent copy.

In a contemplated modification to the device just described above using the particular invention described herein, the electrostatic latent image is formed not from a given master, but in response to a pattern of light and dark spots produced on the photoconductive surface by an array of shutter controlled optical fibers having a light source at the far end. The fiber terminates near the surface of the photoconductive drum. By opening and closing the shutter in response to digital electronic signals,, light and dark spots are created, forming a latent electrostatic image in a manner somewhat similar to an ink jet printer. This image can then be developed by the same general process outlined above i.e. by applying toner to the light and dark areas as represented by electrical charge patterns, utilizing electrophotographic apparatus as presently known. The result is a method of converting digital data to a printed, visual image which has many present advantages.

Considerable effort is currently being expanded to develop lazer scanners and other methods of converting digital data to a visual image. Among the methods employed are LCD, ink jet, thermal paper, thermal transfer ribbon, and laser scanners with both rotating mirrors and holographic scanners. However, these units fail as one wishes to either increase the recording speed, reduce the cost or size of the unit, or increase the resolution of the image.

It is an objective of the present invention to provide a moderate speed alternative to presently known systems.

It is a further objective of the invention to provide a solid state based system for converting digital data to visual images utilizing a system having no moving parts.

In a system such as an electrophotographic apparatus, it is an objective to provide a printing speed of up to 60 copies per minute (CPM).

It is a further objective of the present invention to provide a system which is compact; highly reliable; and capable of long life in a difficult environment wherein unsophisticated users control the system.

A further objective is to achieve the above advantages while keeping costs under control.

The above objectives are achieved by utilizing a thermally responsive shutter to interrupt or transmit light through an optical fiber. In a preferred embodiment a small heater, such as a resistence heater, is positioned centrally under a gap in an optical fiber. At one end of the fiber is an illumination source; the opposite end of the fiber is the output end. The gap between the two segments of the optical fiber is filled by a dye solution comprising a volatile organic or other liquid, and a high opacity dye. In the normal state, the dye solution interrupts the light passing through the glass fiber. Upon activation of the heater, the gap is sufficiently small that a bubble will form between the ends of the glass fibers. This removes substantially all of the dye from the gap between the fibers, and permits light to pass from the light source to the output end of the optical fiber.

In a preferred embodiment, the resistence heater is turned on and off under digital control, with the resistance element being on to represent a one and off to represent a zero. In this embodiment, a high speed flashing light source may be used as the light input; by synchronizing the flashing light with the bit rate of the data input, light can pass through the fiber whenever the resistance heater element is turned on. By providing an array of optical fibers, and placing their output ends adjacent a photoconductive surface binary data can be converted into arrays of dots to form letters or other data on the photoconductive surface.

The apparatus including the optical switch of the present invention is shown in FIG. 1; an array of such optical switches, aligned between a light source and a lens system and positioned relative to a photoconductive drum is shown in FIG. 2.

The features and advantages of the invention as just recited can be understood more completely by reference to these figures, where like numbers are applied to corresponding elements in each drawing. Referring to these drawings, FIG. 1 illustrates an optical switch 10 interposed between a first light path 12 and a second path 14. These light paths or wave guides 12, 14 preferably comprise optical fibers, and focusing elements or lenses 16 at least at the output end of the light path. The switch 10 comprises a heating element 20 positioned under a gap in the light path or light guides 12, 14; and a dye solution 22 which fills the gap 23 between the two wave guides 12 and 14. The dye solution in this gap between the ends of the wave guides or optical fibers comprises volatile organic or other liquid and a high opacity dye. The liquid is probably methanol to promote extremely rapid heating of the solution.

A light source represented by the light 24 is positioned at one end of the light path; a reflector 26 may be used to surround the light source and focus the light on the end of the wave guide path. The output of the light path is, in this exemplary embodiment coupled to a photoconductive drum 28 which records the representation of light or dark depending upon whether the shutter is open or closed as explained below.

In the normal or closed state of the shutter 10, the dye solution 22 interrupts the light from source 24 passing through the fiber 14, attenuating this light by the absorption of the dye solution times the coupling coefficient of the glass fiber.

When the shutter is to be opened to allow light to pass from optical path 14 to optical path 12, the heating element 20 is turned on by a brief electrical pulse. It has been calculated that 0.12 microjoules are sufficient to form a vapor bubble 50 microns in diameter in water (where the heat of vaporization is 9700 calories per gram mole). If a 50 micron gap 23 is left between the wave guide 14 and wave guide 12, activation of the heater 20 will form a bubble which will substantially fill the space between the ends of the guides, 12, 14. This will forceably remove virtually all of the dye from this gap 23, and permit light to pass from guide 14 to guide 12.

If the light source 24 is left on continuously, then whenever a bubble is formed in the solution 22 by the heater 20 a light pulse will appear at the output end of the fiber. Thus any pulse from a binary data source such as heater control 30 (FIG. 2) will result in the formation of a dot of light at the output end of the optical path 12 and therefore on the surface of a recording medium such as photoconductive drum 28.

It has been calculated, in a system making copies on $8\frac{1}{2}$ inch by 11 inch paper, at a resolution of 400 dots per inch, that 25 copies per minute may be generated. At a reproduction rate of 300 dots per inch, 33.3 copies per minute can be generated. This calculation assumes that each data pulse is applied for 100 microseconds with a rise time of 0.1 microsecond and a fall time of 0.1 microsecond.

If the assumption is made (for the worst case) of all dots in an array of the size necessary to produce the above resolution being turned on simultaneously, then in the 400 dot per inch case the power required is 640 watts if the power requirement is $1.1 M_j$/dot. This is the amount of power that the liquid 22 which comprises the dot forming substance would have to be able to dissipate in the worst case. It is for this reason that in FIG. 2 a cooling and circulating system 32 is shown as incorporated into the system. Such a cooling system is of course capable of being achieved in the cooling system art as presently known; to the extent this amounts to an unmanageable level of heat dissipation, the printing rate can be slowed. Further, a safe assumption is that under normal printing conditions the power dissipation would be under 10 percent of the theoretical worst case amount, or less than 64 watts. It should also be noted that this is a worst case assumption, and the 0.1 mJ of energy is $10^3$ times the theoretical power calculated to form a 50 micron bubble.

Considering further FIG. 2, the system represented in block form comprises an array of fibers 12 and 14, and a corresponding array of focusing lenses 16 which are used to focus the individual outputs of each lens on the photoconductive drum surface 28. In this way, a plurality of bits may be simultaneously conveyed to the drum surface 28 by presenting them to an array of heaters 20. Each of these heaters would be positioned in a gap 23 between first and second light paths 12, 14 defined by first and second wave guides. The light source 24 is preferably a light flashing synchronously with the firing of the hearters 20 by control 30. The heater itself would be of relatively simple construction fabricated with known integrated circuit techniques, for formation of resistors. The control bits are supplied either in serial or parallel fashion from the control 30; but in the preferred embodiment the data is loaded serially to simplify the data transfer system. The control 30 simply need be capable of the function of withdrawing data from storage 31 at the desired data rate and transferring it over an output bus 33 to a register having a storage location for each heater element. The bits stored define the heaters which are to be energized to define the dots on each line necessary to form the characters, each character being comprised of a plurality of such dots. Once a bit is stored for each heater, a single pulse turns on all the heaters which are to be energized concomitant with the flashing of the light source.

In a typical example, if a relatively high resolution is desired, the data could be presented in serial form to define 2000 bits per line. To write 2000 lines with 2000 bit/line per second, in a time frame of $5 \times 10$ to the minus 4 seconds per line, a bit rate of 20,000,000 bits per second is required. This limits the system to 400 microseconds for forming the bubbles, exposing the photoconductive surface, and allowing the bubble to collapse. This timing assumes a continuous light source. Alternatively if a flash tube is used as a light source 24, then the exposure could be as short as 50 microseconds; i.e. the system could be defined to allow $200\mu$ seconds to set the switches; $200\mu$ seconds to fire the switches thereby forming the bubble to open the path; and $50\mu$ seconds for firing the light source to expose the receiving surface. Depending on the heater reaction time (as defined by bubble formation time) the data input rate could be attendantly lowered. This permits lower data rates on the order of 10 meghertz. Even lower printing rates allow corresponding lower bit transfer rates to the heater register to be used.

As to the fiber or wave guide material being used to carry the light itself form the source 24 to the photoconductive drum, in a typical embodiment using a drum surface comprising $AS_2SE_3$ about 1.5 ergs per square centimeter of light energy is required. The area of typical fibers should be $3.8 \times 10^{-2}$ centimeters$^2$. With a fiber of this size, and assuming a gap 23 of 50 microns or about equal to the cross section of the fiber 12, 14, then sufficient energy will reach the photoconductive surface of the drum 28 to effectively expose the drum in either case. As to the coupling of the fibers to the drum surface, two alternatives are possible: The fibers may be direct coupled to the photoconductive surface 34 of drum 28 or, a form of lens 16 such as a strip lens or selfoc lens may be employed.

While the amount of light which theoretically reached the drum surface is probably sufficient in the first case, the practicality of such close spacing of the array of ends of wave guides 12 to the drum surface 34 is probably not practical due to the dust and dirt contamination which is inherently present in such a system. Alternatively, an array of a strip lenses or an array of Selfoc lenses may be used. A Selfoc lens is a piece of graded index optical fiber of appropriate length used to collinate or focus light traveling along an optical fiber. (Selfoc is a trademark of the NIPON Sheet Glass Company, Limited) Use of such an array of lenses provides an especially useful system, especially where a flash tube is used as source 24 to apply the light to the input end 14 of the wave guides. A sufficient life time of the flashing light source can probably be expected in that at output energy slightly below 0.1 joules per flash, a light source life time of the order of $10^9$ flashes can be expected according to published data sheets from E.G. & G. company. Obviously, a single flashing light source 24 could be used to illuminate the input ends of an entire series of wave guides, and calculations have shown that using a value of 2000 flashes per second, then the light source life time if calculated to be $10^9$ flashes, would be equal to approximately 2 million 8½×11 sheet copies.

The other key component comprises the dye solution 22. The dye solution has been defined herein as a high opacity dye mixed with an organic volatile solution such as Methanol. Dyes such as are already known in the art have an absorption in a 50 micron thick layer sufficient to reduce the intensity of the light traveling through guide 14 by 200 times. Even with losses, due to residual dye effects when the heater forms a bubble, the off to on contrast should be greater than 100 to 1. It appears also that a common container 32 can be provided for the dye solution which is to fill all the gaps in the array of wave guides. Therefore only a single dye solution container and single cooling and circulating system need be provided.

In summary, the light switch of the present invention would provide a simple, low cost, high speed, high contrast light switch. It appears that integrated circuit fabrication techniques could be readily adapted to the construction of an array of such light switches, by fabricating the array of heaters using solid state techniques; the fiber array could then be put down, and a photoresistant layer used to locate the gaps in the fibers relative to the resistive heater array. Such a process would permit the locating method to be carried out at the same time that the solid state components are produced. Such a method would allow for grooves to be laid down in a substrate into which fibers 12,14 could be positioned and optically aligned with the resistors which shall function as heaters 20 of course the holes defining the gap locations are not necessarily along a straight line. In fact, experimentation has shown that a curved, S shaped line may be advantageous. With such a layout, a single chamber can still be used to fill all holes or gaps with the necessary volatile organic fluid. Further, the ends of the light fibers could all be brought together in one bundle or a limited group of bundles to make it easier to illuminate all with a single light source or light flash.

Further, it appears that a particularly useful area for such light guide arrays lies in the area of photoconductive drum exposure systems. The outputs of an array of light switches 10 could be either directly coupled or coupled through appropriate lenses to the surface 34 of a photoconductive drum 28 for exposing the surface of the drum at what is in present systems effectively the image station. Since such a drum is responsive in systems already in use to light and dark, the binary information could thereby be converted into lines of dots on the surface of the drum, changing the voltage gradient on the surface in accordance with known principles to develop the binary information as a visual display.

Other embodiments of the present invention or uses for the light switch, may become apparent to one of skill in the art who has studied this invention disclosure. Therefore the scope of this invention is to be limited only by the appended claims.

What is claimed:

1. A light switch comprising at least two optical fibers, linearly aligned, and defining a gap between the fibers,
   an opaque heat responsive fluid for normally blocking passage of light through said gap,
   means for creating a bubble in said fluid in response to heating the fluid,
   means for holding said fluid so that a portion thereof rests in said gap,
   said heat responsive fluid means including heater element means aligned with said gap for causing said bubble to form in said fluid, said bubble optically connecting said fibers, whereby light is allowed to pass through said aligned fibers of said switch in response to actuation of said heater element.

2. A light switch as claimed in claim 1 wherein said fluid comprises a high opacity dye.

3. A light switch as claimed in claim 1 wherein said fluid comprises a volatile organic liquid.

4. A light switch as claimed in claim 1 wherein said fluid comprises methanol.

5. A light switch as claimed in claim 1 wherein said gap is no greater than the cross-sectional diameter of said fiber.

6. A light switch as claimed in claim 1 wherein said heater element is responsive to a source of binary data to selectively heat said fluid, said light switch further comprising a light source flashing synchronously with the bit rate of said binary data source.

7. An apparatus for recording high resolution binary data at selected spots on an erasable reusable photoresponsive medium which includes means for producing exposure signals in binary form, an array of optical fibers for conveying light from a source to said photoresponsive medium, each of said optical fibers having a fluid filled gap therein to define first and second portions of said fiber, an opaque heat responsive fluid for normally blocking passage of light through said gap,
   means for creating a bubble in the fluid in response to heating the fluid, and heater means aligned with each of said fluid filled gaps and responsive to said binary data for heating said fluid to form a bubble in said gap in response to said binary data, and thereby optically coupling said first and second portions of said fiber to selectively pass light from said source to said photoresponsive medium in response to actuation of said heater.

8. A recording apparatus as claimed in claim 7 wherein said fluid comprises a volatile, organic fluid.

9. A recording apparatus as claimed in claim 8 wherein said fluid comprises a high opacity dye.

10. An apparatus as claimed in claim 9 wherein said light source flashes synchronously with the data rate of said binary data source.

11. An apparatus as claimed in claim 10 further comprising means for circulating and cooling said fluid to stabilize the response time of said fluid to said heater means.

12. In an electrophotographic copying apparatus in which electrically charged toner of one polarity corresponding to an image to which the drum is exposed is transferred from an oppositely electrically charged surface of a photoconductive drum to the front side of a blank sheet of paper, an improved system for selectively exposing said photoconductive surface to a light source providing light conveyed to a point adjacent said surface by an array of optical light transmissive fibers, the improvement comprising each of said optical fibers having a fluid filled gap therein to define first and second portions of said fibers, an opaque heat responsive fluid for normally blocking passage of light through said gap, and means for creating a bubble in a fluid in response to heating the fluid, comprising heater means aligned with each of said fluid-filled gaps and responsive to said binary data for heating said fluid in response to said binary data to form a bubble in said gap, and thereby optically couple said first and second portions of said fiber to selectively pass light from said source to said photoresponsive medium in response to actuation of said heater.

13. The improvement of claim 12 wherein said light source flashes synchronously with the data rate of said binary data, said system including a lens interposed between the end of each fiber and said photoconductive surface.

14. The improvement of claim 13 wherein said fluid comprises a volatile fluid including a high opacity dye.

* * * * *